Oct. 7, 1941.         J. M. BING         2,258,313
FILM SCRAPER
Filed Feb. 12, 1941
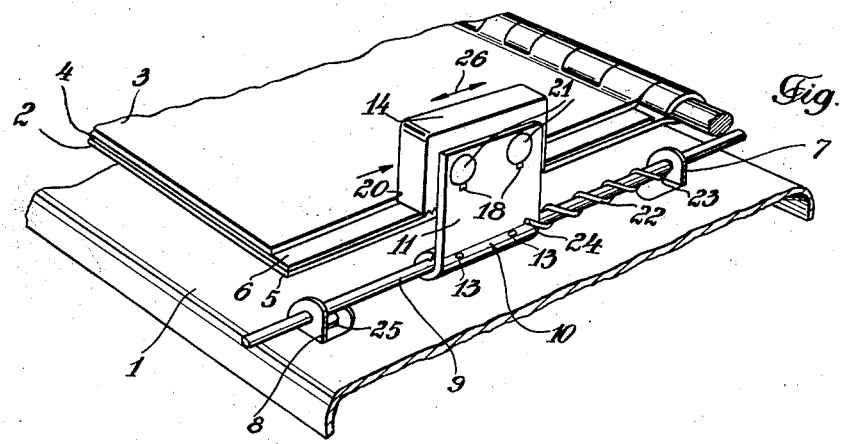
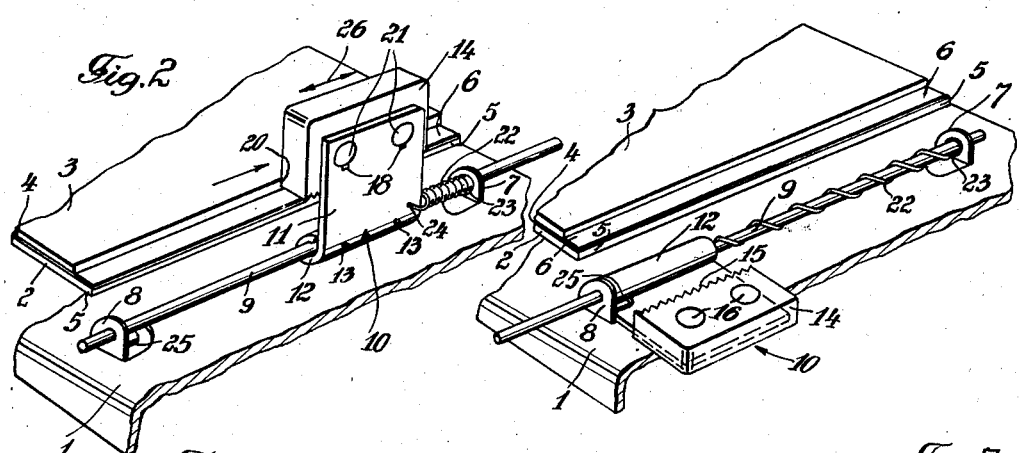
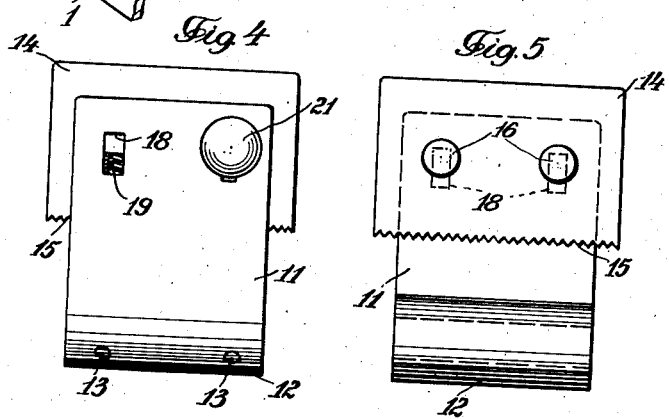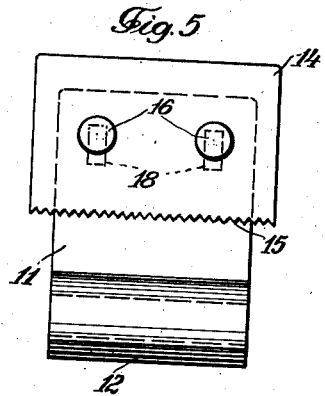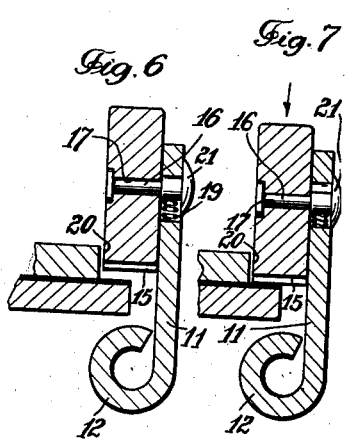
INVENTOR:
Joseph M. Bing
BY
agent Patented Oct. 7, 1941

2,258,313

UNITED STATES PATENT OFFICE 2,258,313

FILM SCRAPER

Joseph M. Bing, New York, N. Y.

Application February 12, 1941, Serial No. 378,585

5 Claims. (Cl. 15—93)

This invention relates to film scraping arrangements, and more particularly to film scraping devices combined with film handling apparatus as film splicers, or the like.

It is an object of my present invention to provide a film scraping arrangement which is held in inoperative position during the treatment of the film, e. g. shearing, splicing, or the like, not impeding or interfering with this treatment, and is moved substantially automatically into operative position, when required.

It is a further object of my invention to provide a film scraping device which can be moved easily and quickly into inoperative position, out of the path of the film splicing plates, and which can be turned into operative position simply by pushing the rod carrying the scraping device.

Still a further object of my invention consists of a scraping device having a scraping surface which is adjustable vertically as well as laterally, thereby enabling correct placement of this scraping surface on the emulsion to be scraped off.

Another object of my invention consists of a scraping device which can be operated with the right hand, thus facilitating and speeding the scraping operation.

With the above objects in view, my present invention mainly consists in a film splicing apparatus comprising a splicer base, a splicer plate adapted to support a film with an end thereof reaching to the edge of said plate, and a scraping device which is attached hingeably and slidably to guiding means arranged on said splicer base under said plate edge in such a manner as to be adapted to be tilted into erected operative position and to be slid in this operative position to and fro, parallel to said plate edge, thus scraping off the emulsion of the film portion lying adjacent to said plate edge.

The novel features which I consider as characteristic for my invention are set forth in particular in the appended claims. The invention itself, however, both as to its construction and its method of operation, together with additional objects and advantages thereof, will be best understood from the following description of specific embodiments when read in connection with the accompanying drawing, in which:

Fig. 1 is a perspective view of the scraping arrangement constructed in accordance with and embodying a preferred form of my invention, with the scraping device in intermediate scraping position;

Fig. 2 is a perspective view of the arrangement shown in Fig. 1, with the scraping device in pushed-back position;

Fig. 3 is a perspective view of the same arrangement, with the scraping device in turned-down position;

Fig. 4 is a rear view of the scraping device seen in direction of arrow 4 of Fig. 6, with one attaching rivet omitted;

Fig. 5 is a front view of the scraping device, seen in direction of arrow 5 of Fig. 6;

Fig. 6 is a cross-section of the device along line 6—6 of Fig. 4, in inoperative position; and Fig. 7 is a cross-section of the device shown in Fig. 4, in pushed-down operative position.

Referring to the figures, wherein a preferred embodiment of my invention is illustrated, the splicing apparatus, in combination with which the scraping arrangement is shown, comprises a splicer base 1, a lower splicer plate 2 adapted to support a film 4, and an upper splicer plate 3 adapted to clamp this film to the supporting plate 2. The width of the upper plate has to be such as to provide a free ledge 5 on the lower plate whereon an edge portion 6 of the film may be exposed when clamped by said upper plate.

Splicing apparatus of the type indicated above are well-known and need therefore no further detailed description of their construction and their mode of operation; it should be, furthermore, stressed that this splicing apparatus is not a part of my present invention, which consists mainly of the new scraping arrangement per se. This scraping arrangement can be used not only in combination with a splicer, but it can be combined with any kind of film handling or treating apparatus which include a base and a plate which is arranged at a certain distance above this base and is adapted to support a film with an end thereof reaching to a straight edge of this supporting plate.

Proceeding now in the detailed description of the scraping arrangement, this arrangement comprises two bearing-like brackets 7 and 8; bracket 7 is arranged nearer to the rear, and bracket 8 nearer to the front edge of the splicer base 1. Guide rod 9 is supported slidably and turnably by brackets 7 and 8; the scraping device 10 is secured to guide rod 9 between brackets 7 and 8.

This scraping device 10 comprises the scraper support 11 secured to guide rod 9 by means of a sleeve-like extension 12 and pins 13. Support 11 carries at its other end the scraper head 14, slidably normal to guide rod 9. Scraper head 14 is provided with a serrated, rasped scraping face 15 adapted to be slid to and fro on the exposed portion 6 of film 4. Rivets 16, passing through holes 17 in scraper head 14 and through the longitudinal slots 18 in scraper support 11, serve for attaching the scraper head 14 to the scraper support 11; by attaching the scraper head to the scraper support by aid of the longitudinal slots 18, sliding of the scraper head normal to the direction of the guide rod is made possible.

In order to prevent undesired engagement of the scraping surface with the film emulsion to be scraped off, and in order to prevent interference of the scraper head with the splicer plate 2 when the scraping device is turned into operative position, small compression springs 19 are arranged in the longitudinal slots 18 pressing rivets 16 and thus scraper head 14 upward, i. e., away from the guide rod 9 and the splicer plate 2.

It must be noted that it is important to shape the scraper support 11 and the scraper head 14 in such a manner that when turned into operative position, the scraper head does not strike against plate 2 but strikes with its front edge 20 only against the upper plate 3. Furthermore, it has to be taken into consideration when fixing the dimensions of support 11 and scraper head 14 that the film 4 supported by plate 2 often tends to bend upward at its front edge and therefore the scraping device must be shaped in such a manner that the distance between the scraping face 15 and plate 2 be as large as possible, considering, however, the fact that the scraper head 14 has to strike against splicer plate 3.

In order to simplify the construction of the scraping device, the small compression springs 19 are attached neither to the scraper support 11 nor to the scraper head 14, but are only inserted in the slots 19 and held in these slots by the rivet heads 21 which are made large enough to cover these slots entirely.

A spiral compression spring 22 is wound on rod 9 between the rear bracket 7 and the scraper support 11, and is secured at its one end 23 to this bracket 7, and at its other end 24 to support 11.

This spring 22 is wound on rod 9 and fixed to bracket 7 and support 11 in such a manner as to exert on said guide rod both a longitudinal and torsional push, the latter tending to force support 11 and scraper head 14 into the operative erected position.

In inoperative position, the scraping device is turned down, as shown in Fig. 3; it is held in this position by catch 25 arranged on the front bracket 8. This catch is shaped in such a way as to allow disengagement and thus self-erection of the scraping device when rod 9 is pushed in direction toward the rear bracket 7.

The operation of my new scraping arrangement is the following:

When not in use, the scraping device is in inoperative position, shown in Fig. 3; after insertion of the film to be scraped off between plates 2 and 3, and shearing off the film portion projecting over the front edge of plate 2, the scraping device is moved into operative position, shown in Figs. 1 and 2. This is done by pushing rod 9 at its front end slightly, against action of spring 22, toward the rear bracket 7, thereby disengaging catch 22 from scraper support 11 and allowing spring 22 to turn this hinge with scraper head 14 into operative position, striking with edge 20 of the scraper head against the splicer plate 3.

It must be noted that in this position, shown more in detail in Fig. 6, the scraping face 15 of scraper head 14 is not in contact with the emulsion to be scraped off, but, as pointed out above, a certain distance has to be maintained between film 6 and the scraping face of the scraper. The emulsion of the projecting film portion 6 is scraped off by pressing the scraper head by hand against the film surface, as shown in Fig. 7, and moving it to and fro in direction of arrow 26, as shown in Figs. 1 and 2.

It is evident that my new mode of attaching the scraper head to the scraper support, and the latter to the splicer base, secures wide possibilities of adjustment of the scraper head during scraping, i. e., makes it possible to bring the scraping face into full contact with the film surface, thereby avoiding scratching and uncomplete scraping and abrading of the emulsion.

When, after scraping-off, it is desired to move the scraping device into inoperative position, out of the path of the splicer plates, it is only necessary to turn down the scraping device by hand into the position shown in Fig. 3, and to allow the device to slide by action of the spiral spring 22 toward bracket 8, thereby engaging catch 25. This catch then holds the scraping device in inoperative position until it is needed again.

It will be understood that each of the elements described above, or two or more together, may also find a useful application in other types of film scraping arrangements differing from the types described above.

While I have illustrated and described the invention as embodied in film splicing apparatus, I do not intend to be limited to the details shown, since various modifications and structural changes may be made without departing in any way from the spirit of my invention.

Without further analysis, the foregoing will so fully reveal the gist of my invention that others can by applying current knowledge readily adapt it for various applications without omitting features that, from the standpoint of prior art, fairly constitute essential characteristics of the generic or specific aspects of this invention, and therefore such adaptations should and are intended to be comprehended within the meaning and range of equivalency of the following claims.

What I claim as new and desire to secure by Letters Patent is:

1. In a film handling apparatus, including a base and a plate arranged above said base and adapted to support a film with an end thereof reaching to a straight edge of said plate, a film scraping arrangement comprising two bearings on said base arranged under said straight plate edge at a certain distance from each other, a guide rod slidably and turnably carried by said bearings, a scraper support secured to said guide rod between said bearings, a scraper head carried by said scraper support slidably normal to the direction of said guide rod, and at least one spring arranged between said scraper head and said scraper support, pressing said scraper head away from said guide rod.

2. In a film handling apparatus, including a base and a plate arranged above said base and adapted to support a film with an end thereof reaching to a straight edge of said plate, a film scraping arrangement comprising two bearings on said base arranged under said straight plate edge at a certain distance from each other, a guide rod slidably and turnably carried by said bearings, a scraper support secured to said rod between said bearings, longitudinal slots in said scraper support arranged normal to the direction of said guide rod, a scraper head, rivet-like means secured to said scraper head and passing through said slots, thereby slidably attaching said scraper head to said scraper support, and small compression springs within said slots pressing said rivets and thereby said scraper head away from said guide rod.

3. In a film handling apparatus, including a base and a plate arranged above said base and adapted to support a film with an end thereof reaching to a straight edge of said plate, a film scraping arrangement comprising two bearings on said base arranged at a certain distance from each other, a guide rod slidably and turnably carried by said bearings, a scraper support secured to said rod between said bearings, longitudinal slots in said scraper support arranged normal to the direction of said guide rod, a scraper head, rivet-like means secured to said scraper head and passing through said slots, thereby slidably attaching said scraper head to said scraper support, small compression springs within said slots pressing said rivets and thereby said scraper head away from said guide rod, a spiral compression spring wound on said guide rod between one of said bearings and said scraper support, said spring fixed at one end to one of said bearings, and at the other end to said scraper support in such a manner as to exert on said guide rod both a longitudinal and torsional push, and a catch on the other of said bearings adapted to engage and thus to hold said scraper support with said scraper head in inoperative position between said base and said plate, when said scraper support with said scraper head is turned by hand into said inoperative position and is allowed to slide, by action of said spiral spring, toward the bearing carrying said catch.

4. In a film splicing apparatus, including a splicer base and a splicer plate adapted to support a film with an end thereof reaching to the straight edge of said splicer plate, a film scraping arrangement comprising two bearings arranged on said base under said splicer plate edge, one of said bearings arranged nearer to the front and the other nearer to the rear edge of said base, a guide rod slidably and turnably carried by said bearings, a scraper support secured between said bearings to said rod, longitudinal slots in said scraper support normal to the direction of said guide rod, a scraper head, rivet-like means secured to said scraper head and passing through said slots, thereby slidably attaching said scraper head to said scraper support, small compression springs within said slots pressing said rivets and thus also said scraper head away from said guide rod, a spiral compression spring wound on said guide rod between the rear bearing and said scraper support, said spring fixed at one end to said rear bearing and at the other end to said scraper support in such a manner as to exert on said guide rod both a longitudinal and torsional push, the latter tending to force said scraper support with said scraper head into operative erected position, and a catch on the front bearing adapted to engage and thus to hold said scraper support with said scraper head in turned down inoperative position, when said scraper support and said scraper head are turned by hand from erected operative position into turned down inoperative position, said catch being shaped in such a manner as to allow disengagement and thus self-erection of said scraper support with said scraper head into operative position, when the guide rod carrying them is pushed toward the rear bearing.

5. In a film handling apparatus including a base and a plate arranged above said base and adapted to support a film with an end thereof reaching to a straight edge of said plate, a film scraping arrangement comprising two bearings on said base arranged under said straight plate edge at a certain distance from each other, a guide rod slidably and turnably carried by said bearings, a scraper support secured to said guide rod between said bearings, a scraper head carried by said scraper support slidably normal to the direction of said guide rod, at least one spring arranged between said scraper head and said scraper support pressing said scraper head away from said guide rod, a spiral compression spring wound on said guide rod between one of said bearings and said scraper support, said spring fixed at one end to said bearing and at the other end to said scraper support in such a manner as to exert on said guide rod both a longitudinal and torsional push, and a catch on the other of said bearings adapted to engage and thus to hold said scraper support with said scraper head in in operative position between said base and said plate when said scraper support with said scraper head is turned by hand into said inoperative position and is allowed to slide, by action of said spiral spring, toward the bearing carrying said catch.

JOSEPH M. BING.